United States Patent [19]

Matsudaira et al.

[11] Patent Number: 5,061,664
[45] Date of Patent: Oct. 29, 1991

[54] PREPARATION OF SINTERED ALUMINUM NITRIDE

[75] Inventors: Yasushi Matsudaira, Annaka; Hiroshi Mogi, Gunma, both of Japan

[73] Assignee: Shin-Etsu Chemical Co., Ltd., Tokyo, Japan

[21] Appl. No.: 661,407

[22] Filed: Feb. 26, 1991

[30] Foreign Application Priority Data

Mar. 1, 1990 [JP] Japan ................................ 2-50487

[51] Int. Cl.$^5$ .............................................. G04B 35/58
[52] U.S. Cl. ......................................... 501/98; 501/96
[58] Field of Search .................................... 501/96, 98

[56] References Cited

U.S. PATENT DOCUMENTS 4,719,187  1/1988  Bardham et al. ................. 501/98 X
4,746,637  5/1988  Kasori et al. ......................... 501/98
4,770,453  9/1988  Horiguchi et al. ............... 501/96 X
4,883,780  11/1989 Kasori et al. ......................... 501/96
4,950,435  8/1990  Taniguchi et al. ............... 501/98 X
5,001,089  3/1991  Kasori et al. ......................... 501/96

Primary Examiner—Karl Group
Attorney, Agent, or Firm—McAulay Fisher Nissen Goldberg & Kiel

[57] ABSTRACT

Sintered aluminum nitride is prepared by adding a sintering aid to aluminum nitride powder and firing the mixture. The use of a rare earth element oxide mixture comprising 40-80 wt % of $Y_2O_3$, 5-15 wt % of $Dy_2O_3$, 2-10 wt % of $Er_2O_3$, and 2-10 wt % of $Yb_2O_3$ as the sintering aid provides sintered aluminum nitride having high thermal conductivity with minimal grain boundary precipitation and thus suitable as heat dissipating substrates.

3 Claims, No Drawings

PREPARATION OF SINTERED ALUMINUM NITRIDE

This invention relates to a method for preparing sintered aluminum nitride having high heat transfer with minimized grain boundary precipitation.

BACKGROUND OF THE INVENTION

In accordance with the recent marked advance of the LSI technology, the degree of integration of LSI is greatly increased with an attendant increase of heat release per package. The heat sink ability of substrate materials is of greater importance. Thus aluminum nitride substrates having good heat dissipation now draw attention as a substitute for the conventional alumina substrates.

In general, aluminum nitride substrates are prepared by molding aluminum nitride powder under pressure and firing the compacts. Since aluminum nitride itself is less susceptible to sintering, sintering aids are often added to the aluminum nitride powder prior to sintering. It is well known to use calcium oxide and yttrium oxide as the sintering aids as disclosed in Japanese Patent Publication Nos. 49510/1983 and 9475/1981, respectively.

These sintering aids, however, have both advantages and disadvantages and are not fully satisfactory as sintering aids for aluminum nitride. More particularly, the addition of yttrium oxide has the advantage that the sintered aluminum nitride shows high heat transfer, but the disadvantages that its source material is expensive, the sintering temperature must be as high as 1,800° C. or higher, and grain boundary precipitation occurs during sintering so that the resulting sintered bodies have poor appearance. In turn, calcium oxide is cost effective because its source material is inexpensive, but the sintered bodies show low heat transfer.

SUMMARY OF THE INVENTION

An object of the present invention is to provide a new and improved method for preparing aluminum nitride sintered bodies having high heat transfer with minimized grain boundary precipitation at low cost.

The inventors have found that by adding a rare earth element oxide mixture comprising 40 to 80% by weight of $Y_2O_3$, 5 to 15% by weight of $Dy_2O_3$, 2 to 10% by weight of $Er_2O_3$, and 2 to 10% by weight of $Yb_2O_3$ as a sintering aid to aluminum nitride powder, there are obtained highly heat conductive aluminum nitride sintered bodies with minimized grain boundary precipitation at an acceptable cost.

The yttrium oxide which is a well known sintering aid for aluminum nitride is generally available from a source material in the form of a rare earth element oxide mixture containing 40 to 80% by weight of yttrium oxide, which is also known as a yttrium concentrate. In our attempt to directly add this source material to aluminum nitride powder and fire the mixture, the inventors have discovered that quite unexpectedly, sintered bodies having high heat transfer and uniform outer appearance can be produced at relatively low sintering temperatures, as compared with the addition of yttrium oxide in isolated form. In accordance with this discovery, we have investigated the composition of a rare earth element oxide mixture effective as sintering aids for aluminum nitride and finally reached the above specified composition.

The conventional yttrium oxide sintering aid is generally obtained by concentrating a source material into a rare earth element oxide mixture as an intermediate and isolating yttrium oxide from the remaining rare earth element oxides, thereby obtaining high purity yttrium oxide. Since the rare earth elements have similar chemical nature, it is very difficult to recover them in pure isolated form (see Japanese Patent Publication No. 28292/1970). The task of isolating and refining high purity yttrium oxide from a rare earth element oxide mixture is costly by nature. In contrast, the present invention uses the sintering aid in the form of a rare earth element oxide mixture which is an intermediate in the process of isolating yttrium oxide from the source material and which is thus substantially less expensive than the yttrium oxide sintering aid, leading to a great reduction in the manufacturing cost.

Therefore, in a method for preparing sintered aluminum nitride comprising the steps of adding a sintering aid to aluminum nitride powder and firing the mixture, the present invention is characterized by the use of a sintering aid comprising 40 to 80% by weight of $Y_2O_3$, 5 to 15% by weight of $Dy_2O_3$, 2 to 10% by weight of $Er_2O_3$, and 2 to 10% by weight of $Yb_2O_3$ based on the weight of the sintering aid.

Although a number of proposals were made in the art to utilize rare earth element oxides as sintering aids for aluminum nitride, it is our discovery that by using a rare earth element oxide mixture or yttrium concentrate obtained by concentrating yttrium oxide values in a raw material, aluminum nitride sintered bodies having high heat transfer with minimized grain boundary precipitation can be produced at a low cost.

DESCRIPTION OF THE PREFERRED EMBODIMENTS

Characteristic of the present invention is the use of a rare earth element oxide mixture as a sintering aid as described above. The sintering aid has a composition comprising
40 to 80%, preferably 50 to 70% by weight of $Y_2O_3$,
5 to 15%, preferably 7 to 13% by weight of $Dy_2O_3$,
2 to 10%, preferably 4 to 8% by weight of $Er_2O_3$, and
2 to 10%, preferably 4 to 7% by weight of $Yb_2O_3$
based on the weight of the sintering aid. All the benefits of the invention are not available if any one of the ingredient is outside the range of this composition. More particularly, if the $Y_2O_3$ content is less than 40% by weight, the resulting sintered bodies lose heat transfer property. Sintering aids having more than 80% by weight of $Y_2O_3$ are less cost effective since they can be produced only through sophisticated refinement, and require higher sintering temperatures at which undesirable grain boundary precipitation will occur so that uniform sintered bodies can be produced with difficulty. It is to be understood that the remaining component of the sintering aid other than the above mentioned essential components may be up to 25%, preferably up to 22% by weight of another rare earth element oxide or oxides, for example, $La_2O_3$, $CeO_2$, $Pr_2O_3$, $Nd_2O_3$, $Sm_2O_3$, $Eu_2O_3$, $Gd_2O_3$, $Tb_2O_3$, $Ho_2O_3$, $Tm_2O_3$, and $Lu_2O_3$.

The rare earth element oxide mixture may be used in the form of composite yttrium-dysprosium-erbium-ytterbium (Y-Dy-Er-Yb) oxide or a mixture of $Y_2O_3$, $Dy_2O_3$, $Er_2O_3$, and $Yb_2O_3$, although a yttrium concentrate which is an intermediate in the manufacture of high purity yttrium oxide is preferred. All these forms can improve the sintering ability and heat transfer of aluminum nitride due to the synergistic effect of the respective rare earth elements.

The sintering aid used herein may be prepared by any desired method, for example, the same procedure as used in the conventional process of manufacturing high purity yttrium oxide, but until the yttrium concentrate or intermediate rare earth element oxide mixture is obtained.

According to the present invention, the rare earth element oxide mixture is added to powder aluminum nitride as the sintering aid. The powder and sintering aid are fully mixed into a uniform mixture which is then molded to a desired shape and fired. The sintering aid added is used in an effective amount for improving the sintering ability and heat transfer, preferably from 0.1 to 30%, more preferably from 0.1 to 10% by weight based on the weight of the aluminum nitride powder. More than 30% by weight of the sintering aid will provide no further effect and rather adversely affect the heat transfer.

It is not critical how to mix the aluminum nitride powder and the sintering aid. They may be mixed by conventional methods using conventional mixers such as ball mills. The mixture may be molded into any desired shape by a variety of methods such as powder compaction, doctoring, and extrusion molding. A doctor blade method is preferred when it is desired to produce heat dissipating substrates. The molded mixture is then fired by conventional methods. For example, it is fired into a sintered body at a sintering temperature of 1,700° to 2,000° C. under a pressure of 1 to 10 kgf/cm$^2$ in a non-oxidizing atmosphere such as nitrogen gas, argon agas, ammonia gas, a mixture of nitrogen and hydrogen gases.

According to the present invention, there are obtained aluminum nitride sintered bodies which are uniformly and closely compacted bodies having a high density and possess minimal grain boundary precipitation and good uniform outer appearance. Therefore, they are very suitable as heat dissipating substrates such as heat sinks. They can be manufactured at a low cost.

EXAMPLE

Examples of the present invention are given below by way of illustration and not by way of limitation.

Example and Comparative Example

To aluminum nitride powder having a mean particle size of 1.2 μm and an oxygen content of 0.8% by weight was added 5% by weight of a rare earth element oxide mixture (yttrium concentrate) having the following composition as a sintering aid.

| Sintering aid composition | |
|---|---|
| $Y_2O_3$ | 66.0% by weight |
| $Dy_2O_3$ | 9.5% by weight |
| $Er_2O_3$ | 4.7% by weight |
| $Yb_2O_3$ | 4.2% by weight |
| Other rare earth oxides* | 15.6% by weight |
| Total | 100.0% by weight |

*including $La_2O_3$, $CeO_2$, $Pr_2O_3$, $Nd_2O_3$, $Sm_2O_3$, $Eu_2O_3$, $Gd_2O_3$, $Tb_2O_3$, $Ho_2O_3$, $Tm_2O_3$, and $Lu_2O_3$.

They were mixed into a powder mixture which was press molded into disks having a diameter of 10 mm under a pressure of 1 ton/cm$^2$. The disks were then fired at different temperatures of 1,700° C., 1,750° C., and 1,800° C in a nitrogen atmosphere for 3 hours, obtaining aluminum nitride sintered disks.

The sintered disks were examined for outer appearance (grain boundary precipitation) and thermal conductivity. The results are shown in Table 1.

For comparison purposes, high purity yttrium oxide having a purity of 99.99% by weight was added to the same aluminum nitride powder as used in Example. The resulting mixture was molded and fired under the same conditions as in Example, and examined for density, outer appearance, and thermal conductivity. The results are also shown in Table 1.

TABLE 1

| | | | Sintered disks | | |
|---|---|---|---|---|---|
| | Sintering aid | Sintering temp. | Density | Thermal conductivity* | Outer appearance |
| Example | Yttrium conc. | 1700° C. | 3.05 g/cm$^3$ | 132 W/mK | No grain boundary precipitation |
| | | 1750° C. | 3.21 g/cm$^3$ | 158 W/mK | No grain boundary precipitation |
| | | 1800° C. | 3.30 g/cm$^3$ | 180 W/mK | No grain boundary precipitation |
| Comparison | 99.99 wt % $Y_2O_3$ | 1700° C. | 2.83 g/cm$^3$ | 83 W/mK | No grain boundary precipitation |
| | | 1750° C. | 3.04 g/cm$^3$ | 125 W/mK | Grain boundary precipitation |
| | | 1800° C. | 3.25 g/cm$^3$ | 168 W/mK | Grain boundary precipitation |

*at room temperature by the laser flash method

As seen from Table 1, the aluminum nitride sintered bodies obtained according to the invention have higher density, higher thermal conductivity and better appearance than the conventional ones.

Although some preferred embodiments have been described, many modifications and variations may be made thereto in the light of the above teachings. It is therefore to be understood that within the scope of the appended claims, the invention may be practiced otherwise than as specifically described.

We claim:

1. A method for preparing sintered aluminum nitride comprising the steps of:
    adding a sintering aid to aluminum nitride powder, said sintering aid comprising 40 to 80% by weight of $Y_2O_3$, 5 to 15% by weight of $Dy_2O_3$, 2 to 10% by weight of $Er_2O_3$, and 2 to 10% by weight of $Yb_2O_3$ based on the weight of the sintering aid, and firing the mixture.

2. The method of claim 1 wherein the sintering aid is added in an amount of 0.1 to 30% by weight based on the weight of the aluminum nitride powder.

3. The method of claim 1 wherein the mixture is fired at a temperature of 1,700° to 2,000° C.

\* \* \* \* \*